(No Model.)
G. D. SUTTON.
CONDUIT FOR ELECTRIC WIRES AND CABLES.
No. 367,768. Patented Aug. 2, 1887.
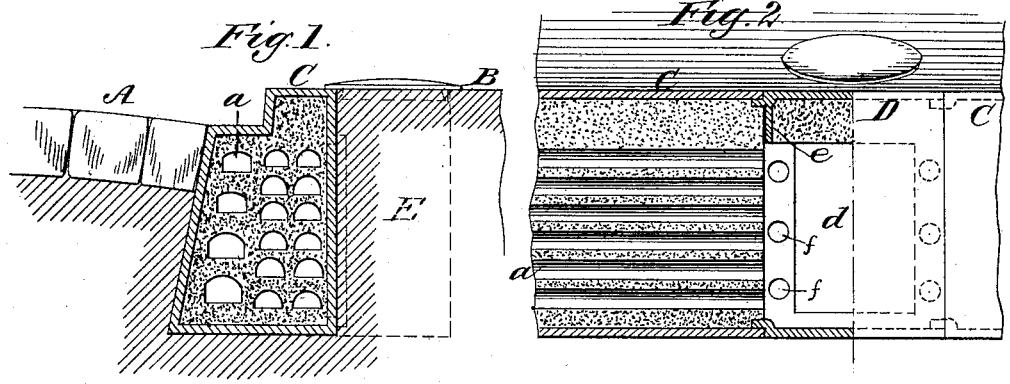
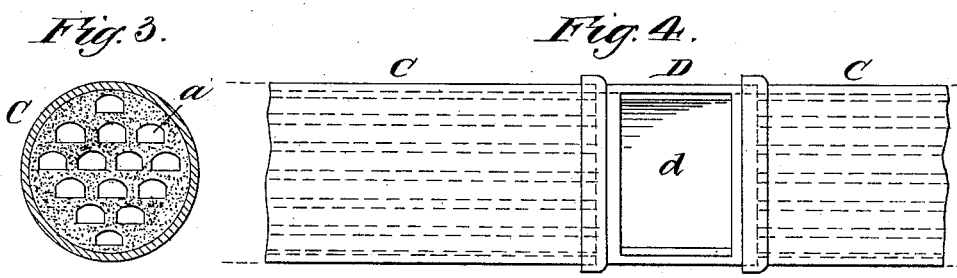
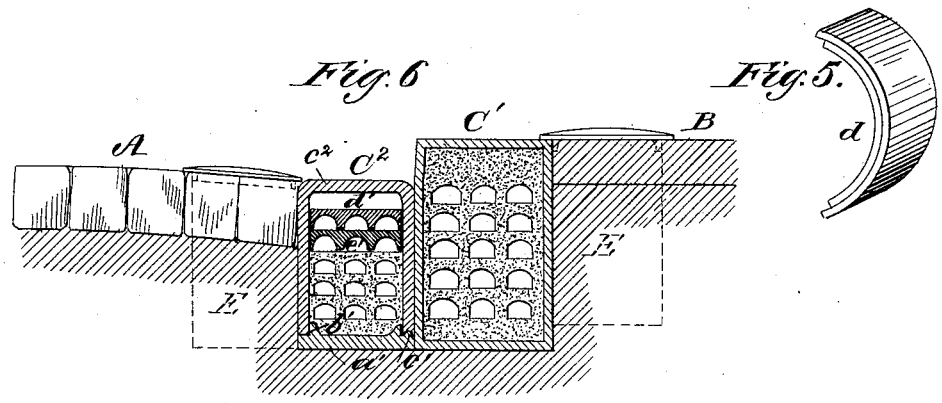
WITNESSES:
Benjamin Miller.
W. E. Bowen
INVENTOR
George D. Sutton,
BY J. E. H. Bowen
ATTORNEY.

UNITED STATES PATENT OFFICE.

GEORGE D. SUTTON, OF NEW YORK, N. Y., ASSIGNOR TO GEORGE D. SUTTON, JR., OF SAME PLACE.

CONDUIT FOR ELECTRIC WIRES AND CABLES.

SPECIFICATION forming part of Letters Patent No. 367,768, dated August 2, 1887.

Application filed August 5, 1886. Serial No. 210,069. (No model.)

*To all whom it may concern:*

Be it known that I, GEORGE D. SUTTON, a citizen of the United States, and a resident of New York, in the county of New York and State of New York, have invented certain new and useful Improvements in Conduits for Electric Wires and Cables, of which the following is a specification.

My invention has reference to casings for electric wires and cables, and is especially intended to accommodate the electric-wire service of cities and towns.

The object of my present improvements is to devise a practicable casing for the purpose in question which may be advantageously employed in the position which the ordinary curbing or gutter slabs now occupy, or which may be used under the streets, pavements, or other paths.

A further object is to devise a casing into which electric wires and cables may be readily drawn by the usual mechanism employed for such purposes, and which will enable the wires and cables to be easily approached for lateral connections.

A further object is to so construct the casing that extraordinary precaution need not be taken to insulate the wires and cables to guard against difficulty arising from induction.

By my invention I aim to supply an economical and efficient method whereby the electric-wire service may be placed under foot.

My invention is hereinafter described, and its novel features defined in the claims at the end of this specification.

In the accompanying drawings, which form a part of this specification, and in which like parts are indicated by like letters, Figure 1 is a cross-section of a casing adapted to be employed as a combined curb and gutter, and embodying my invention. Fig. 2 is a longitudinal vertical section, partly in side elevation, of two lengths of the casing shown in Fig. 1, with an intermediate short length for furnishing means of access to the wires or cables within the conduit. Fig. 3 is a cross-section of a cylindrical casing embodying my invention. Fig. 4 is a side elevation of two lengths of the casing shown in Fig. 3, with an intermediate short section. Fig. 5 is a detail view showing the door of the intermediate short section of Fig. 4; and Fig. 6 is a cross-section of a casing adapted for use as a curb, but a smaller casing—in this instance of peculiar construction—adapted for use as a gutter.

Referring to the drawings, the letter A indicates the carriage-way of a street, and B the sidewalk thereof. C indicates a casing occupying in Fig. 1 the position of the curb and gutter. This casing may be composed of cast or wrought iron, or of artificial stone, or of any other suitable material. Its form will depend somewhat upon the position it is to occupy. For instance, if to be used on the gutter and curb line of a street or path, it may be desirable to make it of the form shown in Figs. 1 and 2. If it is to be used as a curb simply, or merely as a gutter, the forms shown in Fig. 6 may be utilized; and if said casing is to be completely buried beneath the street or pavement surface, while either of the forms of Fig. 6 may be employed, that shown in Figs. 3 and 4 will probably be preferred. These casings will be made in sections of desirable lengths and the sections joined together by any suitable joint.

I prepare the sections for the reception of the electric wires and cables by filling the same with a suitable asphaltic concrete or material of like qualities, in which, by the use of suitably-shaped cores, a series of inverted trough-shaped ducts are formed. These ducts are indicated by the letter $a$, and they may be of any desirable size. The object of filling the shell or casing with asphaltic concrete or like material provided with ducts, as shown, is to furnish an insulating substance for surrounding the wires and cables, and thereby do away with the necessity, in some degree at least, for insulating the conductors themselves, and avoid the liability of difficulties arising from induction. The asphaltic concrete is also protected by the outside shell from being damaged by deleterious substances in the soil, or by heat arising from the pipes of steam-heating systems—such, for instance, as now in use in some of the cities.

To enable the wire and cables within the casing to be easily reached for lateral connections, I make use of short sections of casing— say about fourteen inches in length. The letter D indicates such short sections, and, as shown in Fig. 2, the interior of the top of the same may be filled with asphaltic concrete, (and the rest of the interior surface may be suitably lined with an insulating-lining.) The doors of short section D are designated by $d$. This door is not as wide as the width of the section, and fits against jambs $e$, formed on section D and provided with suitable locking means. The jambs $e$ are perforated, as shown at $f$, for the purpose of furnishing convenient means of making lateral connections. These perforations when not in use should be closed by plugs, and when in use they will be insulated in any well-known and satisfactory manner.

In Figs. 3 and 4 I show a cylindrical conduit composed of lengths of casing C. This conduit is filled with asphaltic concrete or like material in the manner described in referring to Figs. 1 and 2, and has a series of ducts, $a$, of inverted-trough-shaped form. The object of making the ducts $a$ of an inverted-trough-shaped form is to facilitate the drawing in of the wires and cables, as the form in question furnishes a duct of enlarged base surface, and thus avoids the tendency of the wires and cables to crowd and rub against one another when being drawn therethrough, as is the case when the duct is cylindrical in cross-section. The short section D of Fig. 4 is substantially the same as that shown in Fig. 2, except instead of concrete filling being employed therein to any extent, the entire interior surface of the section is lined with an insulating substance. This form of the conduit is to be preferred when the conduit is to be completely buried beneath the surface of the ground.

In Fig. 6 I show two casings, side by side, one (C') adapted to be used as a curb and the other (C²) as a gutter; but either of these casings may be used independently of each other, and they may be wholly buried under ground, if required. That marked C' is constructed the same as the casing shown in Fig. 1, and is intended to be used in conjunction with the short sections D. (Shown in Fig. 2.) The casing marked C² consists of a base, $a'$, having the flanges $b'$ and water-joints $c'$ and a top, $c^2$, which is removably placed in position on said base $a'$, one side of said top having a semi-cylindrical groove, which fits over the joint $c'$, as shown. The interior of this shell or casing is provided with a series of separate shelves, $d'$, composed of asphaltic concrete and having flat top surfaces with intermediate inverted-trough-shaped ducts $e'$, as shown. These shelves $d'$ will of course be made of lengths corresponding to that of the casing-sections, and their construction is such that they may be arranged within the casing one upon the other, as shown. The lengths of the casing may be fitted together by any desirable joint that will enable any particular length of the conduit to be entered for examination, or for other purposes, without disturbing the completeness of the conduit-line. When the shell or top $c^2$ is lifted off the stack of shelves $d'$, the wires within the ducts $e'$ may be easily reached for making connections, &c., by raising the shelves. When desirable, two of the conduit-lines, like that shown at C², Fig. 6, may be used side by side as curb and gutter, either with the separable bottoms or without the same. Instead of the separate shelves $d'$ the conduit C² may be provided with a solid mass of concrete having a series of ducts. Any of the above-described conduits may be used as drawing-in conduits, and they are intended to be utilized in that way.

The letter E represents man-holes, which will be located by the sides of the short sections D in order to enable the said short sections to be readily entered without any excavation whatever. The man-holes may be located on the sidewalks or in the streets, or both, according to the particular location of the line of conduit.

Having thus described my invention, what I claim as new, and desire to secure by Letters Patent, is—

1. In a conduit for electric-wire service, the short section D, provided with doors $d$ and with perforated jambs $f$, substantially as set forth.

2. In a conduit for electric-wire service, the short section D, having the interior of its top filled with asphaltic concrete, and provided with doors $d$ and with perforated jambs $f$, substantially as set forth.

3. A conduit for electric-wire service, consisting of sections of iron or other suitable casing filled with asphaltic concrete or material of like qualities, provided with a series of independent ducts, in combination with independent short sections of casing D, devoid of longitudinal ducts, and provided with doors $d$ and with perforated jambs $f$, substantially as set forth.

4. The conduit-section C², consisting of a base, $a'$, having flanges $b'$ and water-joint $c'$, and a removable top, $c^2$, provided with a groove co-operating with the joint $c'$, combined with a series of inclosed shelves composed of asphaltic concrete, and having flat tops, and a series of trough-shaped channels on their bottoms, substantially as set forth.

Signed at New York, in the county of New York and State of New York, this 30th day of July, A. D. 1886.

GEO. D. SUTTON.

Witnesses:
J. E. M. BOWEN,
HUGO KOELKER.